(12) United States Patent
Roessel et al.

(10) Patent No.: US 12,480,601 B2
(45) Date of Patent: Nov. 25, 2025

(54) COMPACT LINE GUIDE FOR CLEAN ROOM APPLICATIONS AND PRODUCTION METHOD

(71) Applicant: IGUS GMBH, Cologne (DE)

(72) Inventors: Rainer Roessel, Buchholz (DE);
Andreas Hermey, Hennef (DE);
Dominik Barten, Meckenheim (DE)

(73) Assignee: IGUS GMBH, Cologne (DE)

( * ) Notice: Subject to any disclaimer, the term of this patent is extended or adjusted under 35 U.S.C. 154(b) by 903 days.

(21) Appl. No.: 17/596,430

(22) PCT Filed: Jun. 13, 2020

(86) PCT No.: PCT/EP2020/025283
§ 371 (c)(1),
(2) Date: Dec. 10, 2021

(87) PCT Pub. No.: WO2021/004654
PCT Pub. Date: Jan. 14, 2021

(65) Prior Publication Data
US 2022/0268372 A1 Aug. 25, 2022

(30) Foreign Application Priority Data

Jun. 11, 2019 (DE) .................... 20 2019 103 276.6
Jan. 14, 2020 (WO) ................. PCT/EP2020/050842
Jan. 14, 2020 (WO) ................. PCT/IB2020/000047

(51) Int. Cl.
*F16L 3/00* (2006.01)
*F16L 3/01* (2006.01)
(Continued)

(52) U.S. Cl.
CPC ................. *F16L 3/015* (2013.01); *F16L 3/13* (2013.01); *H01B 7/0045* (2013.01); *H02G 3/0487* (2013.01)

(58) Field of Classification Search
CPC ..... F16L 3/015; F16L 3/13; F16L 3/01; F16L 3/00; F16G 13/18; H01B 7/0045;
(Continued)

(56) References Cited

U.S. PATENT DOCUMENTS 469,522 A * 2/1892 Hayes .................... H01B 11/04
174/34
3,160,175 A * 12/1964 Laemmle ............... B65D 59/06
24/339

(Continued)

FOREIGN PATENT DOCUMENTS

CN 201904131 7/2011
CN 102379074 3/2012
(Continued)

OTHER PUBLICATIONS

International Search Report from corresponding PCT Appln. No. PCT/EP2020/025283, dated Oct. 12, 2020.
(Continued)

*Primary Examiner* — Nkeisha Smith
(74) *Attorney, Agent, or Firm* — Grossman, Tucker, Perreault & Pfleger, PLLC

(57) ABSTRACT

A method for producing a conduit for a clean room application, comprising electric cables and an elongate flexible sheath which can be moved back and forth so as to form a deflecting bend between two towers, wherein the flexible sheath has a number of parallel receiving portions, each for at least one cable, wherein each receiving portion extends in the manner of a channel in a longitudinal direction from a first end to a second end; the method comprising the steps of providing at least one cable bundle of contiguous cables and providing the flexible sheath, wherein the sheath is prefabricated and the cable bundle is introduced into a receiving portion of the prefabricated sheath, wherein the prefabricated sheath comprises at least one sleeve unit having two
(Continued)

interacting closure profiles of a closure in order to close an open state in a dust-tight manner and the cable bundle is inserted into the opened sheath transversely to the longitudinal direction or the prefabricated sheath comprises at least one sleeve unit which is produced so as to be circumferentially closed and the cable bundle is drawn into the closed sleeve unit in the longitudinal direction.

17 Claims, 7 Drawing Sheets

(51) Int. Cl.
    *F16L 3/015*     (2006.01)
    *F16L 3/13*     (2006.01)
    *H01B 7/00*     (2006.01)
    *H02G 3/04*     (2006.01)

(58) Field of Classification Search
CPC ...... H01B 7/00; H01B 7/0009; H02G 3/0487; H02G 11/00; H02G 11/006
See application file for complete search history.

(56) References Cited

U.S. PATENT DOCUMENTS

| | | | | |
|---|---|---|---|---|
| 3,517,702 | A * | 6/1970 | Trimble | H02G 3/0481 174/DIG. 11 |
| 5,905,231 | A * | 5/1999 | Houte | B60R 16/0215 174/95 |
| 6,215,068 | B1 | 4/2001 | Meier | |
| 7,437,052 | B2 * | 10/2008 | Klein | F16L 3/222 385/147 |
| 7,559,340 | B2 * | 7/2009 | Ikeda | H02G 3/0475 59/900 |
| 7,784,259 | B2 * | 8/2010 | O'Rourke | H02G 11/00 59/900 |
| 7,795,539 | B2 * | 9/2010 | Thuot | H01B 7/0275 174/113 R |
| 8,471,149 | B2 * | 6/2013 | Huynh | H01B 7/048 174/105 R |
| 8,561,949 | B2 * | 10/2013 | Komiya | F16L 3/015 248/68.1 |
| 8,662,456 | B2 * | 3/2014 | Komiya | H02G 11/006 248/68.1 |
| 9,029,698 | B2 * | 5/2015 | Komiya | H02G 11/006 174/72 A |
| 10,083,777 | B2 | 9/2018 | Tetsuka et al. | |
| 10,591,089 | B2 * | 3/2020 | Barten | H02G 11/006 |
| 10,957,467 | B2 * | 3/2021 | Ranganathan | H01B 7/292 |
| 11,811,154 | B2 * | 11/2023 | Hermey | F16L 3/015 |
| 2003/0000198 | A1 | 1/2003 | Hermey et al. | |
| 2006/0233513 | A1 | 10/2006 | Klein | |
| 2008/0217487 | A1 * | 9/2008 | O'Rourke | H02G 11/00 248/65 |
| 2012/0205498 | A1 | 8/2012 | Komiya | |
| 2012/0228437 | A1 | 9/2012 | Tatsuta et al. | |
| 2014/0305672 | A1 | 10/2014 | Komiya | |
| 2016/0315457 | A1 * | 10/2016 | Winer | H02G 7/00 |
| 2018/0195581 | A1 * | 7/2018 | Tetsuka | F16G 13/16 |
| 2022/0397214 | A1 * | 12/2022 | Tanaka | H02G 11/006 |
| 2023/0006433 | A1 * | 1/2023 | Hermey | H02G 15/02 |
| 2024/0229834 | A9 * | 7/2024 | Takahashi | H02G 11/006 |

FOREIGN PATENT DOCUMENTS

| | | |
|---|---|---|
| CN | 107580736 | 1/2018 |
| CN | 109219910 | 1/2019 |
| DE | 907548 | 3/1954 |
| DE | 102006019133 | 6/2007 |
| DE | 102012100290 | 8/2012 |
| DE | 102012100533 | 8/2012 |
| DE | 102014104879 | 10/2014 |
| DE | 112014005554 | 8/2016 |
| DE | 102016000864 | 8/2017 |
| DE | 112017000173 | 1/2019 |
| EP | 0381906 | 8/1990 |
| EP | 0490022 | 6/1992 |
| EP | 1793151 | 4/2005 |
| JP | 2011-239595 | 11/2011 |
| JP | 2017-509104 | 3/2017 |
| TW | 201131588 | 9/2011 |
| WO | 02086349 | 10/2002 |
| WO | 2004049509 | 6/2004 |
| WO | 2011/065430 | 6/2011 |
| WO | 2016042134 | 3/2016 |

OTHER PUBLICATIONS

Office Action from related Japanese Appln. No. 2021-573221, dated Jan. 9, 2024. English translation attached.

Office Action from related Indian Appln. No. 202237001210, dated Mar. 12, 2024. English translation attached.

Office Action from related Singaporean Appln. No. 11202113490U, dated Oct. 6, 2023.

English translation of Office Action from related Chinese Appln. No. 202080051011.6, dated Mar. 20, 2025.

Office Action from related Chinese Appln. No. 202080051011.6, dated Jul. 9, 2025. English translation attached.

* cited by examiner

COMPACT LINE GUIDE FOR CLEAN ROOM APPLICATIONS AND PRODUCTION METHOD

FIELD

The invention generally concerns the field of line guide devices for lines like for example cables for signal or power supply or pneumatic or hydraulic hoses or the like, which are to be dynamically guided between two relatively moveable connecting locations of a machine or installation. There is proposed in particular a line guide device which is suitable for use in clean rooms, for example in semiconductor or flat screen production, in pharmaceutical installations, in medical devices and so forth. In such applications the release of particles by the line guide devices is particularly unwanted and has to be minimised to the greatest possible extent.

BACKGROUND

Energy guide chains are typical line guide devices, conventional energy guide chains of a chain link structure with rotary joints however are less suitable for clean room applications as the chain links thereof themselves release particles in operation due to abrasive wear. An energy guide chain suitable for use in a clean room context and which was further developed in that respect was proposed in WO 02/086349 A1. That energy guide chain releases markedly less abrasion dust by virtue of flexible joint connections.

A known problem however is that the lines guided in an energy guide chain which possibly releases less abrasion dust themselves also release particles in operation as they move, bend and rub against each other upon displacement. Thus for example the sheathings of the cables themselves also give off particles to the surroundings upon displacement.

For that reason it is known for the lines to be dust-tightly enclosed. A number of line guide devices for clean room applications, which were further developed for that purpose, were proposed by the present applicant in WO 2016/042134 A1. One of those structures (see FIGS. 10 to 16) is in the meantime available from the applicant (igus GmbH, D-51147 Cologne) under the trade name "e-skin".

The present invention now specifically concerns a line guide device or line protective guide which is suitable for a clean room application, having an elongate flexible enclosure which is reversibly or reciprocatingly displaceable, typically with the formation of a direction-changing arc between two runs between a first connecting location and a connecting location which is moveable relative thereto. In that case the proposed enclosure has a number of receiving means of a tubular configuration for guiding at least one line, wherein each receiving means extends passage-like in a longitudinal direction from a first end to a second end, to which the protection guide is mounted at the connecting locations.

Line protective guides of the general kind set forth of that type are available for example under the trade name "GORE® Trackless High Flex" from W.L. Gore & Associates, Inc. or under the tradename "ChannelFLEX™" or "EcoFlex™" from Hitachi Cable America Inc. A variant of the last-mentioned line protective guide which is viewed here as the general state of the art involved is described for example in DE 10 2012 100 290 B4 or U.S. Pat. No. 8,662,456 B2.

Typically those known line protective guides are produced either by laminating lines in between two films which are welded together and then form the enclosure. That manner of manufacture is known for example from WO 2004/049509 A2 (the bottom of page 11 therein). It is also known for lines, in particular electric cables, to be extruded into an additional enclosure, as already described for example in EP 0 490 022 A2 or in DE 11 2014 005 554 T5.

Such line protective guides are technically of a simple structure and are of a light and compact construction. They have a considerable disadvantage in use for example in relation to WO 2016/042134 A1. A maintenance operation, in particular replacement of an individual line or an individual line strand within a line guide including a plurality of lines or a plurality of line strands is possible only with considerable effort. In particular replacement of individual lines or individual line strands by lines which were already suitably prefabricated with the desired plugs or couplings is not possible on site. That would considerably simplify maintenance and reduce costs. In contrast thereto line guides of the general kind set forth are typically completely renewed as an assembly so that in that case even intact lines have to be replaced. In addition a subsequent modification to an installed line guide, for example for adding further lines, is not readily possible.

SUMMARY

With that background in mind a first object according to the present invention is to propose a line guide which is of a relatively compact structure and/or which is low in weight and which at least partially overcomes the above-mentioned disadvantages. The invention aims in particular to simplify the replacement of individual lines or individual line strands and/or subsequent modifications.

In addition the invention seeks to propose a novel production method for such a line guide.

First Aspect

There is proposed a method for the production of a line guide for a clean room application, with electric lines and an elongate flexible enclosure which is reciprocatingly displaceable in particular with the formation of a direction-changing arc between two runs, wherein the flexible enclosure has a number of parallel receiving means for at least one respective line, wherein each receiving means extends passage-like in a longitudinal direction from a first end to a second end; the method including at least the steps:

providing at least one line bundle of interrelated lines; and
providing the flexible enclosure.

According to the invention it is provided in the method that the enclosure is prefabricated and the line bundle is introduced into a receiving means of the prefabricated enclosure, wherein the prefabricated enclosure comprises at least one and in particular a plurality of enclosure units having two cooperating closure profiles of a closure for dust-tightly closing an opened state and the line bundle is introduced transversely to the longitudinal direction into the opened enclosure; or the prefabricated enclosure includes at least one and in particular a plurality of enclosure units which is/are produced peripherally closed and the line bundle is drawn into the closed enclosure unit in the longitudinal direction.

Accordingly the lines are not laminated in place or extruded with a material-bonded flat ribbon cable and are therefore replaceable easily and in non-destructive manner, even individually.

According to a further core concept according to the invention, in a line guide, it is provided that the enclosure is separately prefabricated and a respective line bundle is introduced into at least some receiving means, wherein the enclosure forms the outer sheath of the line bundle.

A further decisive advantage in that respect is that the line bundles do not require their own outer sheath or also do not have same. On the one hand that saves on unnecessary weight and allows a reduction in the diameter of the line bundles. Accordingly more lines can be inserted with the cross-section of the receiving means remaining the same.

The invention is therefore based inter alia on the realisation which appears surprisingly simple that dedicated outer sheaths which are typically provided in relation to electric lines in particular to provide mechanical protection because of standard requirements are superfluous for the line guides of the general kind set forth. They can be readily formed by the enclosure itself, that is to say replaced thereby. Accordingly the line bundles have a common enclosure and do not have a respective additional outer sheath of their own between the actual conductors and the enclosure.

In preferred embodiments of the method or the line guide it can be provided that the line bundle of interrelated lines includes a wire bundle comprising at least two twisted wires each having their own insulation.

In particular it can be provided that in particular all line bundles do not have their own outer sheath.

It can be provided that the line bundle includes an outward separating layer comprising a slidable material, preferably a material which at its outside includes a fluoropolymer. That facilitates in particular drawing the line bundle into enclosures produced in the closed condition (non-openable enclosures).

The outward separating layer can be in the form of banding, in particular strips of a PTFE-bearing film or a PTFE-bearing non-woven fabric. The banding can have at least one wrapping, in particular two wrappings in opposite directions. Alternatively for example it is also possible to have a separating layer by placing film therearound parallel to the longitudinal direction.

Preferably the line bundle includes at least two highly flexible stranded lines, in particular stranded lines with an individual wire diameter<0.1 mm, in particular <0.08 mm and/or super-fine stranded lines, which is advantageous for very long service lives with many bending changes.

It can be provided that the line bundle includes at least two stranded lines having an insulation comprising a fluoropolymer like for example a PTFE, PFA, PVDF, ETFE, FEP or the like. Such insulations can afford their own sliding action even without banding, in order for example to make it easier to draw the lines in and/or to reduce abrasion dust in the interior.

A tension-resistant core element can be provided in the line bundle, for example to make it easier to draw it in or however to avoid a central hollow cavity when stranding bundles with 5 or more wires.

The line bundle can include a wire bundle comprising at least six layer-stranded or bundle-stranded wires.

In the method with openable enclosures the opened enclosure can be dust-tightly closed after introduction of the line bundles by means of the closure profiles.

It can be provided that each enclosure unit is prefabricated and has two fixing strips which are in opposite relationship at both sides and which are in one piece with the enclosure unit, including the step of connecting the prefabricated enclosure units together in parallel to form an enclosure.

In addition the invention affords the inherent advantage that each line bundle can be replaceably fitted in a corresponding receiving means of the prefabricated enclosure.

It can further be provided that the prefabricated enclosure has a plurality of enclosure units respectively produced with cooperating closure profiles, in particular enclosure units which are extruded in one piece in the opened state; and/or has a plurality of enclosure units which are produced peripherally closed, in particular enclosure units extruded in the form of closed profiles.

It can be provided that each enclosure unit has two fixing strips which are opposite on both sides and which are in one piece with the enclosure units and by means of which adjacent enclosure units are connected together in parallel, and/or the enclosure comprises enclosure units of flexurally elastic plastic, wherein each enclosure unit is of a cross-section which remains the same in the longitudinal direction.

Second Aspect

According to an aspect, which can be advantageously combined with the above-indicated aspects, there is proposed a novel enclosure unit of plastic, more specifically for an elongate flexible enclosure of a line guide, wherein the enclosure unit forms at least one receiving means for guiding at least one line, that extends passage-like in a longitudinal direction from a first end to a second end, and has an enclosure wall comprising a flexible plastic.

The second aspect of the invention is characterised in that the enclosure unit includes a first fixing strip at one longitudinal side and a second fixing strip at the other longitudinal side, wherein the fixing strips are designed in mutually matching relationship for forming a releasable connection, and the fixing strips are flexurally stiffer in comparison with the enclosure wall, wherein the fixing strips include in particular a plastic which is harder in comparison with the enclosure wall and/or in particular of a flexurally stiffer design configuration.

That configuration affords considerable advantages in terms of practical handling for connection and upon release of the individual enclosure units and also allows a more robust connection which nonetheless is non-destructively releasable.

In a development it is provided that the fixing strips are produced in one piece with the enclosure wall, from a first plastic for the enclosure wall and a harder second plastic for the fixing strips, in particular using a co-extrusion method or by subsequent material-bonded connection of the fixing strips to the enclosure wall.

In addition the enclosure unit can have at least at the outside on the enclosure wall and/or on a fixing strip at least one sliding friction-reducing layer. For that purpose in particular a layer comprising a third plastic with a lower sliding coefficient in relation to the first and second plastics can be used. The third plastic is preferably a polyethylene, in particular a PE-HMW or PE-UHMW.

The sliding coefficient in relation to plastics is ascertained as a measurement value in relation to hardened steel with a roughness depth of Rz=2.4 mm, a surface pressure between 0.15 and 1 MPa and a sliding speed of 0.5 m/s.

The enclosure unit can be produced for example in a tri-extrusion method from three different plastics.

If the fixing strips are designed in conjugate relationship with male and female cross-sections the sliding friction-reducing layer can be provided at least at the outside of the female fixing strip.

Additionally or alternatively the sliding friction-reducing layer can cover at least at one side a predominant surface proportion of the outer surface of the enclosure wall.

It is advantageous if the sliding friction-reducing layer is of a layer thickness which is <20% of the thickness of the enclosure wall.

In a further particularly preferred embodiment the enclosure unit is produced in unitary material fashion from a thermoplastic elastomer (TPE), in particular a TPS, TPU or TPO. The enclosure unit can preferably be produced from a TPE suitable for production in a hot extrusion method.

For each receiving means there can be provided two cooperating closure strips of a closure, that extend in the longitudinal direction, for dust-tightly closing an opened state, in which a line can be introduced into or removed from one of the receiving means transversely to the longitudinal direction.

Preferably the fixing strips are adapted to be connected together in a connecting direction transversely relative to the longitudinal direction in order to releasably fix together a plurality of enclosure units with mutually matching fixing strips by connection of the fixing strips in the connecting direction transversely relative to the longitudinal direction.

In combination with the two last-mentioned configurations it is particularly practical in regard to handling if the closure strips are closable and openable respectively by a force substantially perpendicular to the connecting direction of the fixing strips.

Further Features

There is further proposed in a line protective guide that the enclosure in particular laterally at at least one receiving means, has at least one or more functional regions extending in the longitudinal direction, which afford an additional function insofar as the receiving means can be opened as required or individual receiving means can be selectively replaced completely with a new line or individual enclosure units can be selectively replaced completely with a new line strand.

The term line strand in that respect is used to denote a bundle of lines, in particular interrelated lines. In particular consideration is to be given in this respect to partial replacement of individual line strands which are received by one or more enclosure units with one or more receiving means.

For that purpose it can be provided that the functional region provides a closure for opening and closing one or more receiving means so that one or more lines can be inserted or removed transversely relative to the longitudinal direction or laterally/radially, in particular without dismantling the complete enclosure. For that purpose the functional region can have in particular two cooperating closure profiles which are designed for closure in as dust-sealing relationship as possible and which permit an open state of the one or more receiving means, in which a line can be inserted or removed transversely relative to the longitudinal direction.

Alternatively or in addition in accordance with the basic concept according to a second aspect it is provided that the or a functional region includes or forms a fixing strip for release or fitment as required of at least a part of the enclosure or a receiving means. The fixing strip can basically be designed in accordance with any connecting principle, by positively locking and/or force-locking engagement, for non-destructive releasable connection to a corresponding strip or cooperating functional region. The fixing strip can be designed in particular in the form of a fixing bar or fixing profile.

Both concepts for functional enlargement equally allow subsequent replacement or retrofitment with a line which is already equipped with plug connectors, couplings or the like without the enclosure overall having to be dismantled to prevent the escape of particles at the operating location, for example in the clean room. In the first aspect the line can be replaced without modifying the enclosure. In the second aspect only a part of the enclosure together with the lines in question is replaced. In that respect consideration is to be given both to replacement of an individual receiving means with one or more lines or replacement of an enclosure unit with a line strand.

An enclosure unit respectively has at least one receiving means for one or more lines or a line strand. The receiving means can be in particular of a tubular configuration.

In an embodiment the enclosure includes at least one enclosure unit comprising soft-elastic or flexurally elastic plastic which is preferably made in one piece. The enclosure unit could also be of a multi-part structure, for example comprising two symmetrical half-enclosure portions or tube portions similarly divided in the longitudinal direction. A one-piece enclosure unit is preferred here and can for example improve sealing integrity in relation to the escape of particles.

In a preferred embodiment the at least one functional region is respectively connected in one piece to the enclosure unit (so-to-speak releasable only by destruction). For that purpose it can be produced directly in one piece with the enclosure unit or can also be produced separately and subsequently joined in material-bonded relationship to the unit by a joining process, for example by a suitable thermal joining process, in particular welding. The scope of the invention includes in particular separate production of a "simplified profile" without a functional region on the one hand and of the functional region on the other hand, for example by extrusion from various particularly suitable plastics, in particular thermoplastics. The functional region can then be connected in material-bonded relationship in the longitudinal direction to the rest of the enclosure unit to form one part, for example by a welding process for welding plastics.

In an embodiment, in particular according to the second aspect, the enclosure is composed of a plurality of separate enclosure units. In that case each enclosure unit can respectively form precisely one receiving means and can respectively have a lateral fixing strip which is in one piece with the enclosure unit, for example a bar or a profile portion. In addition an enclosure unit can also include a multiplicity of receiving means and can respectively have a lateral fixing strip in one piece with the enclosure unit. In that way individual enclosure units can be connected together in parallel to form an enclosure. In a development in that respect each enclosure unit can have two fixing strips which are in opposite relationship on both sides and which are in one piece with the enclosure units, by means of which strips adjacent enclosure units can be connected in parallel relationship. The fixing strips can be designed for direct cooperation in mutually matching relationship, for example of a conjugate configuration or engaging into each other in positively locking relationship. They can also cooperate with a separate fixing bar which is used for fixing the enclosure units together.

In a preferred embodiment an enclosure is formed by a plurality of enclosure units which respectively have an equal or different number of receiving means. Optionally an individual enclosure unit can in particular have such a number of receiving means that a line strand can be received by precisely one enclosure unit. This advantageously makes it possible that individual line strands within an enclosure can be replaced by replacement of the respectively associated enclosure unit. In that respect the term line strand is used to denote in particular bundles or groups of functionally interrelated lines, for example grouped according to susceptibility to wear or service life.

Each enclosure unit can laterally have, in particular in opposite relationship to the fixing strip, two closure profiles in one piece with the enclosure unit.

In an embodiment it can be provided that the closure profiles of an enclosure unit are closable in positively locking and/or force-locking relationship by connection to the fixing strip of an adjacent enclosure unit. In that way for example in the event of oversize of the closure profiles which engage into the oppositely disposed fixing strip it is possible to achieve a particularly robust closure without additional fitment steps. Alternatively adjacent enclosure units can be respectively connected together in parallel by a separate flexible fixing bar cooperating with the fixing strips. In that way release of the closure (first aspect) is separate from the fixing (second aspect), that is to say separation of an enclosure unit cannot result in unwanted opening of the adjoining enclosure unit so that no abrasive particles are unintentionally discharged.

A further embodiment provides that the enclosure unit includes subdivisions forming a plurality of parallel receiving means and the enclosure unit has a closure (first aspect), in particular at least two closure profiles in one piece with the enclosure unit. In that way inter alia the assembly effort in relation to applications with a large number of lines to be guided can be reduced as an individual enclosure unit to be fitted is not provided for each line. In this embodiment each receiving means preferably has its own associated closure so that all lines remain separately accessible. For that purpose each receiving means can have a pair of cooperating closure profiles in one piece with the enclosure unit.

When long guide lines or particularly soft-elastic enclosures or enclosure units are involved it is possible to provide in at least one and preferably in two laterally outer receiving means a support chain, in particular comprising individual chain links, which is designed to predetermine a direction-changing radius of the direction-changing arc and/or to support a self-supporting run in the straight position.

In a preferred embodiment a fixing profile is provided as the fixing strip at each narrow side of the enclosure, in the case of a subdivided enclosure unit in particular in each case in one piece therewith. Besides expandability it is possible in that way for example as an alternative to a support chain to mount a different kind of support device externally to the fixing profiles of the enclosure. This means that no usable receiving passage is required for a support function. For that purpose a respective external support device can be connected to the fixing profile at each narrow side of the enclosure, which support device is designed to involve a low level of abrasive wear in order to predetermine a direction-changing radius of the direction-changing arc and/or to support a self-supporting run in the straight position. Preferably for that purpose each support device has a carrier band and abutment elements perpendicularly thereto, in particular T-shaped abutment elements, the T-arms of which are in an abutment condition in the direction-changing arc radially inwardly or in the straight position. The carrier band is preferably at the level of the neutral fibre.

In particular according to second aspect with a fixing function (or without an opening function) an embodiment provides that the enclosure includes a plurality of separate and peripherally closed enclosure units. In that case each enclosure unit can respectively form precisely one receiving means. Each enclosure unit can have as functional regions for fixing purposes two fixing strips which are in opposite relationship at both sides and which are in one piece with the enclosure units. In that case the fixing strips can be adapted for positively locking cooperation directly with each other, for example in the manner of a zip closure or sliding closure or the like, or can cooperate with a separate fixing bar in positively locking and/or force-locking relationship.

In accordance with each of the two aspects, and also with a combination of the closure and fixing functions, enclosure units can be of a cross-section which remains the same in the longitudinal direction. That allows profile-like production in an extrusion process, preferably from soft-elastic or flexurally elastic plastic. The functional region can possibly be extruded separately in that case.

A functional region serving as a closure can be manufactured for example by extrusion if the functional region has two conjugate interengaging closure profiles of plastic which remain the same throughout in the longitudinal direction and which cooperate as a press closure or toothless sliding closure. In that case each closure profile can include two engagement profiles and so-to-speak form a double closure.

According to the second aspect there can be provided two laterally oppositely disposed functional regions which each have a respective fixing profile, wherein the fixing profiles are preferably designed for a positively locking connection, for example a tongue-and-groove connection or the like, which is releasable only in the longitudinal direction. In that way unintentional release of enclosure units in operation can be avoided.

Preferably adjacent receiving means are connected or coupled together in parallel by intermediate regions in band form, which predetermine the neutral fibre. Alternatively or in addition preferably in relation to each closure comprising cooperating closure profiles the interface is at the level of the neutral fibre of the enclosure. The neutral fibre is to extend in particular centrally through the cross-section of the receiving means.

Clamping devices can be provided on the enclosure at the end, which close the enclosure and optionally the lines in the axial direction to prevent the escape of dust particles. In a typical situation of use at least two lines and mostly a multiplicity of lines are guided separately from each other in a respective receiving means and are enclosed to be as dust-tight as possible by the enclosure. No particles are intended to issue even at the ends.

The invention also concerns an enclosure unit as an individual part for the production of an enclosure. It is produced from plastic, in particular soft-elastic or flexurally elastic plastic and has at least one tubular receiving means for guiding at least one line, which extends passage-like in a longitudinal direction from a first end to a second end.

According to a combination of the two aspects set forth hereinbefore it is provided that the enclosure unit at a longitudinal side includes two cooperating profiles extending in the longitudinal direction for closing in as dust-sealed fashion as possible, an opened state in which a line can be introduced into or removed from the receiving means transversely relative to the longitudinal direction, and at the other side it has a fixing strip extending in the longitudinal direction for releasable connection to a further enclosure unit, in particular by positively locking and/or force-locking engagement, with a corresponding functional region of a further enclosure unit. In that case the enclosure unit may form a plurality of pronounced receiving means which in particular are parallel and tubular for separate guidance of at least one respective line or can form respectively precisely one receiving means.

In an embodiment in which only the second aspect (fixing function) is involved the enclosure unit has a first fixing profile at one longitudinal side and a second fixing profile at the other longitudinal side, and the fixing profiles are designed for releasable connection by positively locking and/or force-locking connection in mutually matching relationship to releasably fix together a plurality of enclosure units having structurally identical fixing profiles. In the case of structurally identical fixing profiles consideration is to be given in particular to a bar or a profile, wherein the enclosure unit can have a bar at a first longitudinal side and a profile at a second longitudinal side and wherein the bar of a first enclosure unit can be connected to the profile of a second enclosure unit in positively locking and/or force-locking relationship. In that case the first enclosure unit can be in particular structurally identical to the second enclosure unit or for example can have a different number of receiving means.

In a further embodiment the enclosure unit has a first fixing profile at one longitudinal side and a second fixing profile at the other longitudinal side, wherein the fixing profiles are designed for releasable connection by positively locking and/or force-locking engagement in mutually matching relationship in order to releasably fix together a plurality of structurally identical enclosure units.

Furthermore the enclosure unit can have a plurality of or precisely one tubular receiving means for separate guidance of at least one respective line or a line strand. This embodiment is advantageous if the enclosure unit is produced closed in the peripheral direction around the receiving means so that escape of particles at the location of operation is reliably prevented.

BRIEF DESCRIPTION OF THE DRAWINGS

Further details and advantages of the invention will be apparent without limitation on the generality of the foregoing from the description hereinafter of preferred embodiments by way of example with reference to the accompanying drawings in which:

FIGS. 5A-5B show a preferred variant of an openable or closable prefabricated enclosure unit.

DETAILED DESCRIPTION

Figure 1A:
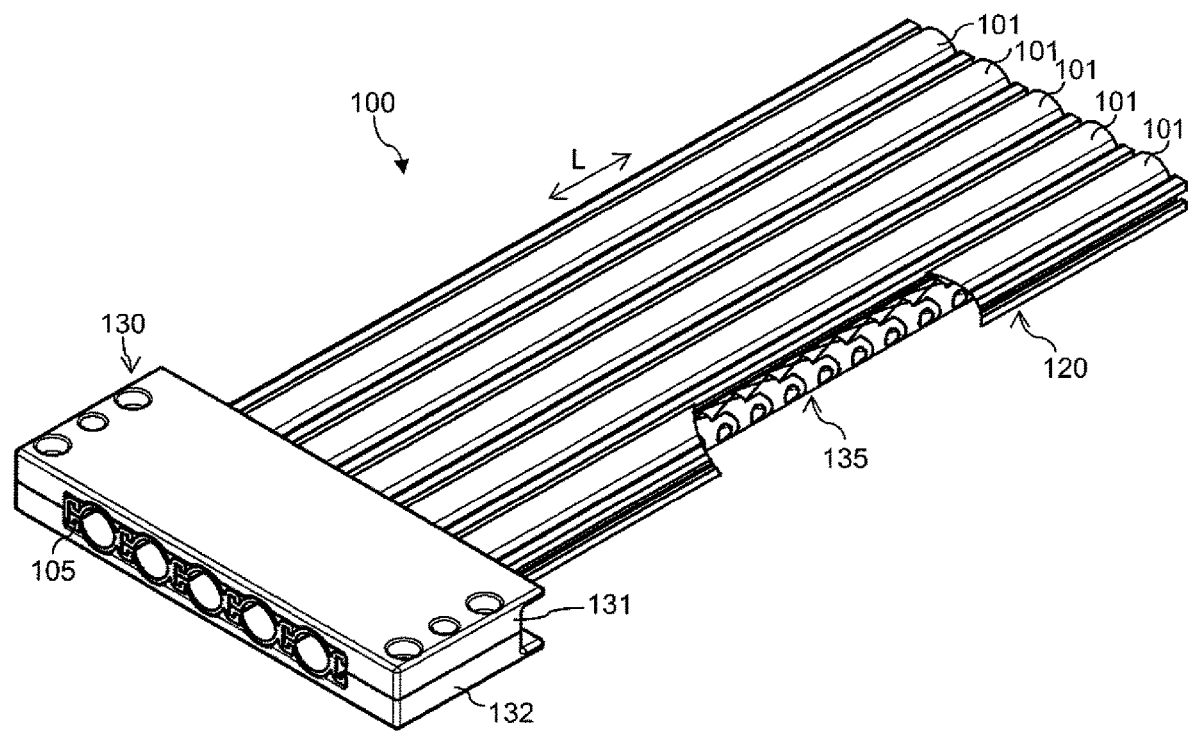
FIGS. 1A-1B show a first embodiment by way of example of a displaceable line protective guide having a flexible enclosure, as a partial view of an end region, partly broken-way (FIG. 1A) and a typical arrangement of a line protective guide or line guide device as a diagrammatic side view.
Figure 1B:
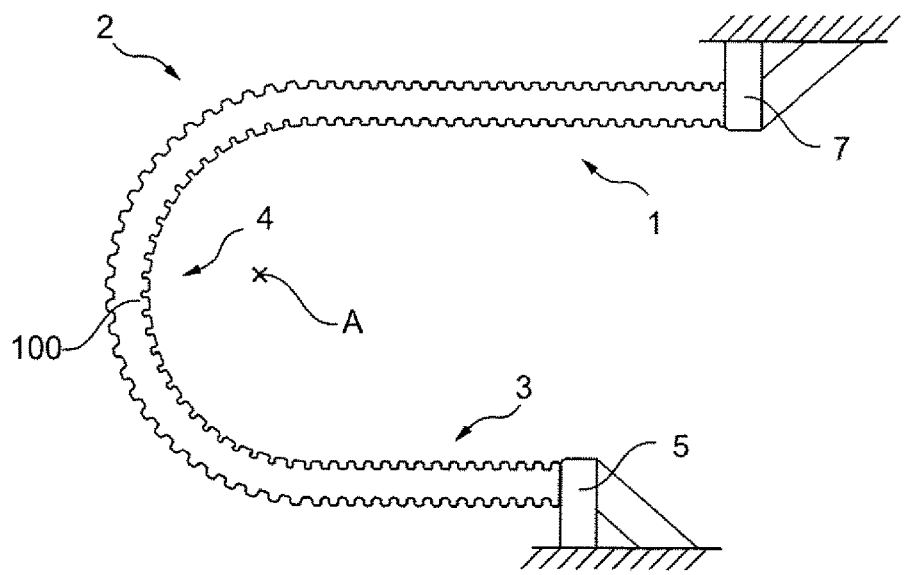

FIGS. 1A-1B diagrammatically show a first embodiment of a reciprocable line protective guide for lines (not shown). It has an elongate flexible enclosure 100 composed of a plurality of individual enclosure units 101 made from plastic. Each enclosure unit 101 is produced from flexible soft-elastic plastic, in particular a thermoplastic, for example PE, PU, TPU, PTFE, expanded PTFE, PP or the like. Over its length each enclosure unit 101 is of a cross-section which remains the same throughout (FIG. 1B) perpendicularly to the longitudinal direction L. The enclosure unit 101 can be for example inexpensively produced in the form of an extrusion in a suitable plastic extrusion process and can be cut to an appropriate length, for example from about 100 mm to about 1500 mm. The structurally identical enclosure units 101 form in the interior thereof a substantially cylindrical receiving means 102 for protective guidance of a line and for that purpose are of a tubular configuration with wall regions 103 which are of thin gauge in relation to the cross-section of the receiving means 102. The receiving means 102 of the flexible enclosure are spatially separated from each other so that no abrasion can occur between lines which are guided in parallel therein.

FIG. 1A further shows one of two end clamping devices 130 having two clamping portions 131, 132, between which all enclosure units 101 of the enclosure 100 together with lines (not shown) guided therein are dust-tightly closed off at the end and in the axial direction, for example by clamping screws. The clamping devices 130 can at the same time also provide for tensile stress relief of the lines (not shown) and can be of a per se known structural configuration, for example similarly to the teaching of DE 10 2012 100 290 B4 incorporated herein in that respect.

FIG. 1A shows one of two support chains 135, which is accommodated in the receiving means 102 of the two laterally outer enclosure units 101 and comprises individual chain links. Optional support chains 135 on the one hand can predetermine the minimum permissible radius of the direction-changing arc 4 (FIG. 8) to protect the chain from kinking and on the other hand by means of abutments for the chain links in the straight position can increase the self-supporting length of the enclosure 100 in the moveable run, for example in the upper run 1 (FIG. 8).

FIG. 1B diagrammatically shows a configuration of a dynamic line guide with dust-tight enclosure 100, for example according to FIG. 1A, forming a moveable upper run 1 and a stationary lower run 3. Between them the enclosure 100 forms a direction-changing arc 4 of predetermined bending radius about a notional axis A. The direction-changing arc 4 travels over a distance relative to a stationary connection 5 when the upper run 1 is displaced with the moveable connection 7. Any spatial position can be involved here however, the enclosure 100 can also move vertically or laterally. The two ends of the enclosure 100 are dust-tightly closed, for example with clamping devices as shown in FIG. 1A. The enclosure 100 is overall of a hose-like configuration and is sufficiently flexible, inter alia by virtue of a suitable configuration and/or by a suitable choice of material, to allow reversible flexible curvature of the direction-changing arc 4 with the application of a small amount of applied force, and to follow the travel movement of the moveable connection 7 with the lowest possible resistance.

FIGS. 9A-9D diagrammatically show an enclosure 900 made up from a plurality of individual enclosure units 901. The enclosure units 901 each form one or more receiving means 902. In contrast to FIGS. 1 to 6 the enclosure units 901 are closed in the longitudinal direction L and in the peripheral direction, that is to say they have an enclosure wall 903 extending without any interruption around the one or more receiving means 902. The enclosure wall 903 is for example in the form of a tube, a hose or the like, with an approximately lens-shaped or double-pointed oval shape cross-section, or also of an oval, elongatedly round or round cross-section. Preferably the lens-shaped cross-section shown in FIGS. 9A-9D is used to provide the receiving means 902. It can be formed in particular from two identical circle segments which are fitted together at their chords symmetrically relative to the neutral fibre. That cross-sectional shape reduces folding, that is to say abrasive wear in the direction-changing arc. The enclosure units 901 are at least predominantly produced from flexible, permanently elastically flexible plastic, in particular being extruded, for example comprising expanded PTFE.

Enclosure units 901 as shown in FIGS. 9A-9D cannot be non-destructively opened, that is to say lines have to be passed therethrough axially or in the longitudinal direction, unlike the situation in FIGS. 1-6. Unwanted escape of particles during maintenance operations can however thereby be reliably prevented. A simplification in maintenance and expandability is achieved with the enclosure units 901 without a closure function at the receiving means 902, solely by the concept of the fixing function or the functional regions 920, 921 cooperating for parallel fixing of individual enclosure units 901. In that respect each enclosure unit 901 can for example have an associated line strand in order to renew a line strand prefabricated with plugs or the like independently of a differing line strand by means of the replacement of an enclosure unit 901.

Each enclosure unit 901 as shown in FIG. 9A-9D has functional regions 920, 921 which are diametrally opposite at both sides and which either are produced in one piece with the closed enclosure wall 903 or are subsequently connected thereto, the functional regions extending continuously in the longitudinal direction L. The functional regions 920, 921 each have as the fixing strip a fixing profile and/or a fixing bar for releasable connection by positively locking and/or force-locking engagement. The functional regions 920, 921 are designed to cooperate for release or fitment as required of an enclosure unit 901 to or from an adjoining enclosure unit 901. A suitable design configuration is described hereinafter with reference to FIGS. 10A-10D.

Figure 9A:
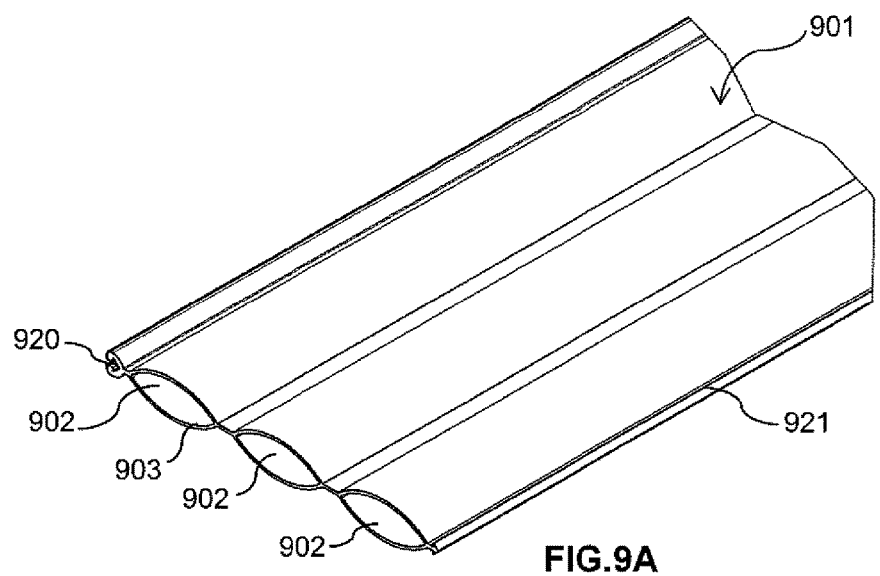
FIGS. 9A-9D show a further embodiment with an enclosure unit having a plurality of receiving means and releasably connected together by lateral fixing profiles.
Figure 9B:
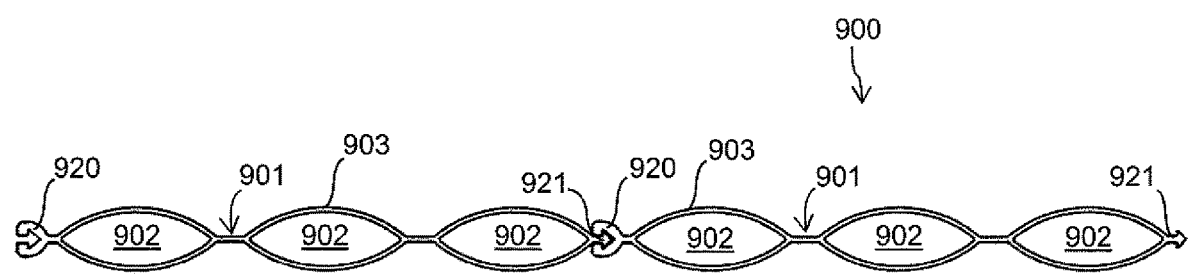
Figure 9C:
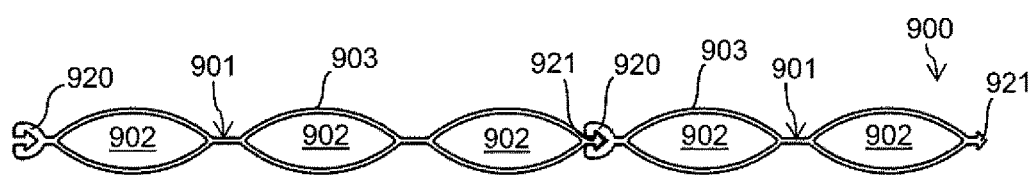
Figure 9D:
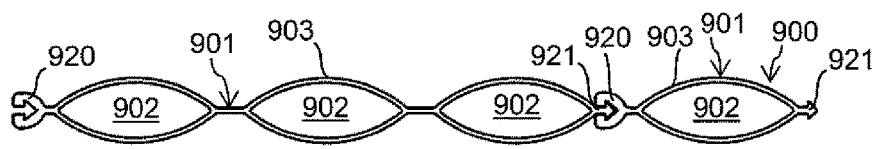

FIGS. 9B-9D show by way of example two connected enclosure units 901, a first enclosure unit 901 forming three receiving means 902. In FIG. 9B a second enclosure unit 901 also has three receiving means 902. In FIG. 9C the second enclosure unit 901 has two receiving means 902 while in FIG. 9D there is one receiving means 902. A different number of receiving means 902 which are formed by an enclosure unit 901 permits adaptation of an enclosure unit 901 to a line strand (not shown), in particular to the number of lines (not shown) within a line strand (not shown). Thus a configuration according to requirements of enclosure units 901 with an adapted number of receiving means 902 within an enclosure 900 makes it possible for an individual line strand (not shown) to be replaced as needed by the replacement of an enclosure unit 901.

It is possible to use for example fixing profiles as functional regions 920, 921 which are of a cross-section that remains the same in the longitudinal direction to permit extrusion. The functional regions 920, 921 here also extend in a strip form in a plane in opposite relationship at two sides along the enclosure wall 903. The fixing strips of the functional regions 920, 921 are designed in the manner of a press closure with interengaging fixing profiles, similarly for example to press-closure bags. The functional regions 920, 921 here cooperate for fixing, possibly also with a separate fixing bar as in FIG. 2, which connects the fixing profiles or fixing bars respectively.

Preferably the functional regions 920, 921 are produced in one piece with the enclosure walls 903 in an extrusion process, either using a unitary material or from different plastics, for example with a flexible but stronger or harder plastic for the functional regions 920, 921. The functional regions 920, 921 can be produced separately, for example by extrusion or injection moulding, and can be integrally connected to the remaining profile of the enclosure unit 901, for example being welded continuously in the longitudinal direction by a suitable procedure. Preferably for that purpose the enclosure wall 903 and the functional regions 920, 921 are made from a thermoplastic material.

Figure 10A:
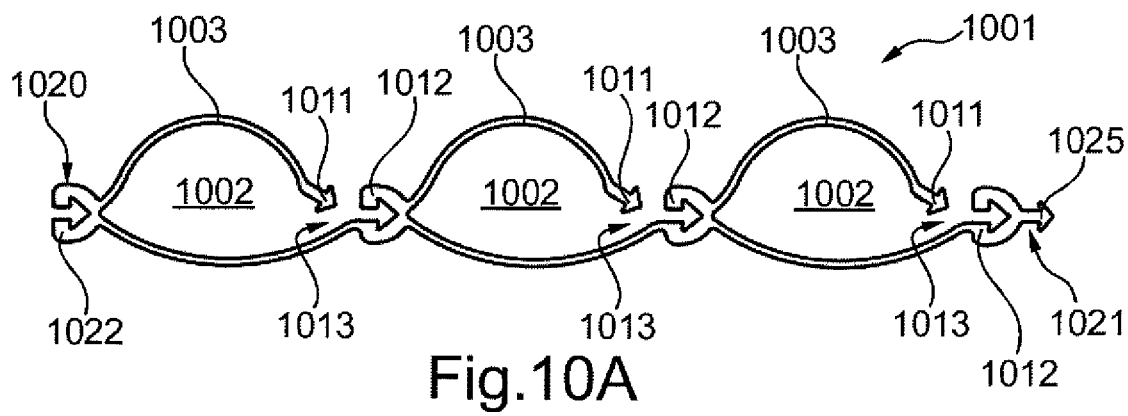
FIGS. 10A-10D show a particularly preferred embodiment with an enclosure unit having a plurality of receiving means which can be individually filled, and preferred cross-sections of associated functional regions.
Figures 10B, 10C, 10D:
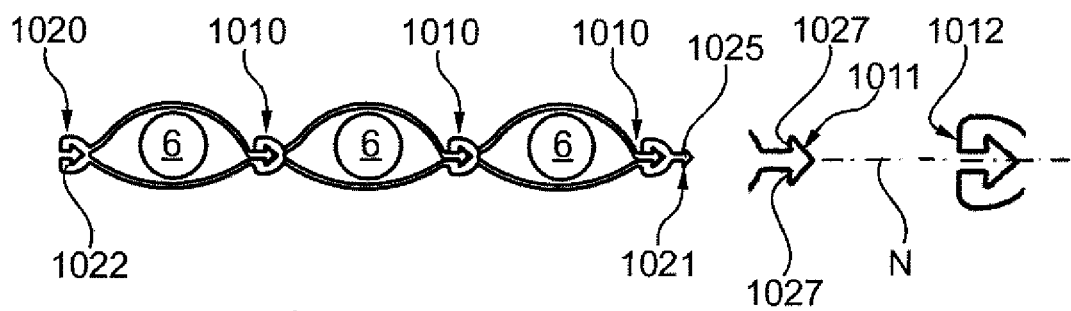

FIGS. 10A-10D show a particularly preferred further example of an enclosure unit 1001 representing a variant of the principle shown in FIGS. 4A-4D. In this case too the enclosure unit 1001 is made from flexible bendable plastic, preferably being extruded, and has a plurality of, for example three, receiving means 1002 for lines 6 in the closed state (FIG. 10B). In that case the enclosure unit 1001 for each receiving means 1002 has its own respective dedicated or associated functional region 1010 which is in the form of a closure, here in particular in the form of a strip-like closure bar with two engagement profiles or closure profiles which engage into each other in conjugate relationship, namely a hook profile 1011 which can engage into a claw profile 1012. The hook profile 1011 and the claw profile 1012 are respectively provided with at least one undercut configuration, preferably two symmetrical undercut configurations, and engage into each other with a barb-like function, that is to say they are relatively easy to close or connect but are to be released only with the application of a markedly higher force.

In addition at both opposite narrow sides the enclosure unit 1001 also has a respective functional region 1020 and 1021 serving for modular fixing of a plurality of enclosure units 1001 with correspondingly structurally identical functional regions 1020 and 1021 in a position laterally in mutually juxtaposed relationship or at a support device (see FIG. 3A). The fixing strips or bands 1020, 1021 are here too in the form of a claw profile 1022 and a hook profile 1025 respectively, similarly or structurally identical to the closure functional regions 1010.

Figure 4:
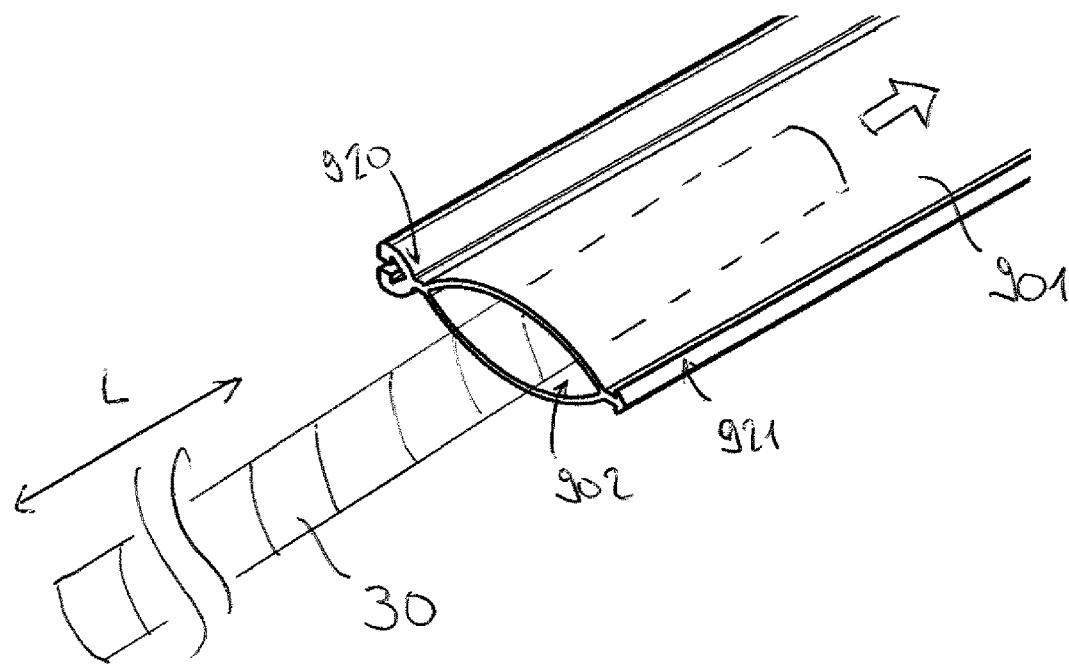

FIGS. 10C-10D show diagrammatically enlarged cross-sectional views of the hook profile 1011 and the claw profile 1012 which of structurally identical configuration can also be used for the closure functional regions 1020 and 1021. The hook profile 1011 and the claw profile 1012 are of a cross-section which remains the same throughout in the longitudinal direction (perpendicular to the plane of FIGS. 10C-10D) and are in the form of flexible strips or bands which are bendable about the axis A in the direction-changing arc 4 (FIG. 4). The hook profile 1011 is in the form of a symmetrical double-hook profile with respect to the neutral fibre N, for example as shown here being of an arrowhead shape, a mushroom shape or the like, and has respective corresponding rear undercut configurations or undercuts. The rear sides 1027 can extend rearwardly inclinedly at an angle with respect to the plane of symmetry and the connecting direction to enhance the action as a barb and to reliably prevent unwanted release. The claw profile 1012 is of a corresponding cross-section symmetrically with respect to the neutral fibre N. The claw profile 1012 has an inner receiving means with a matching cross-section in matching or conjugate relationship with the hook profile 1011, wherein the receiving means can be of an undersize to achieve a force-locking connection. Around that receiving means the claw profile 1012 forms two claw-like bars or strips which engage behind the hook profile 1011 like a jaw and hold it fast. Other forms of a hook profile 1011 and a claw profile 1012 respectively can also be considered, in particular as in the case of toothless zip fasteners, in particular sliding or press closures made of plastic. The foregoing structure can be appropriately used for the fixing functional regions 1020, 1021. Zip fasteners 1010 or 1020, 1021 with interengaging parts which are of a substantially uniform cross-section over their entire length and which are operated without a slider as that construction can be easily implemented using an extrusion process are preferred.

An arrangement of the closure functional regions 1010 and fixing functional regions 1020 and 1021 at the level of the neutral fibre N as shown in FIGS. 10A-10D is particularly advantageous. The neutral fibre N, also referred to as the zero line, is the layer in the cross-section, whose length does not change upon bending, in particular upon displacement of the direction-changing arc 4 (FIG. 8), that is to say the layer which maintains a constant dimension in the longitudinal direction upon curvature.

The closure functional regions 1010 and fixing functional regions 1020 and 1021 can be produced with a unitary material with the walls of the receiving means 1002 or can be produced from a comparatively flexurally stiffer plastic, for example using an extrusion process, for example to enhance the stability of the connections and the enclosure unit 1001 overall.

Figure 11:
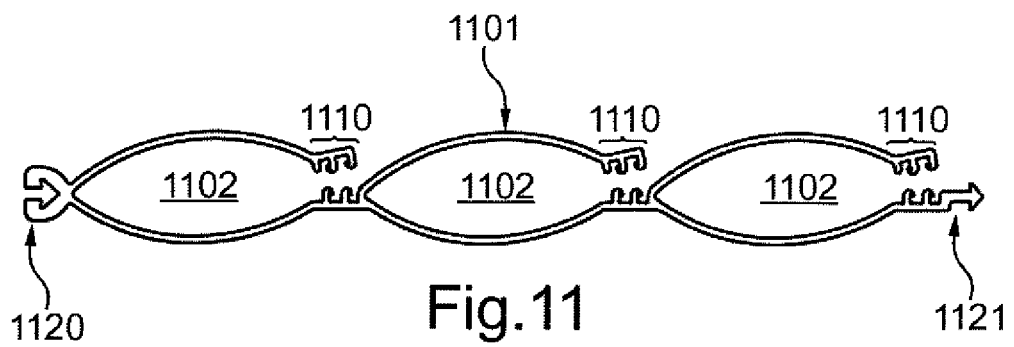
FIGS. 11-12 show further embodiments as variants in relation to FIGS. 10A-10D.
Figure 12:
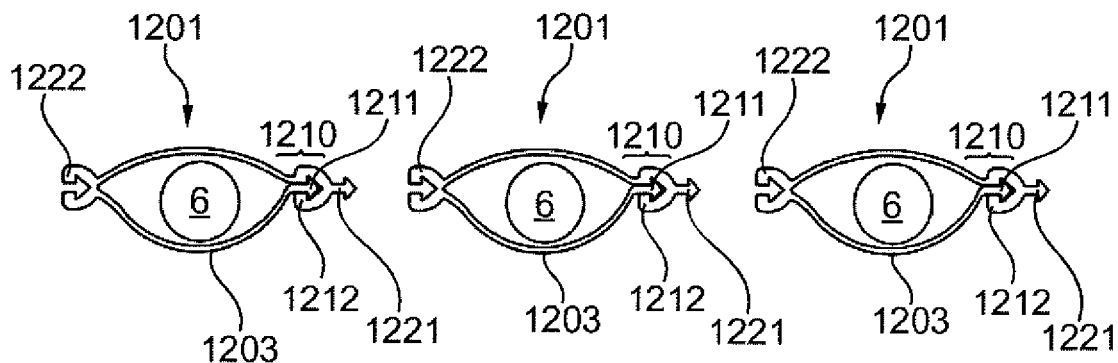

FIG. 11 shows a modification with an enclosure unit 1101 in which the fixing functional regions 1120 and 1121 are designed in accordance with the principle shown in FIGS. 10A-10D. In contrast the closure functional regions 1110 are in the form of double-hook engagement profiles based on the principle shown in FIGS. 4A-4C. It is to be noted in that respect that the view in FIGS. 4A-4C is not true to scale as the closure functional regions 410 are shown there on a greatly enlarged scale. Typically the functional regions 1010, 1020 and 1021 or 1110, 1120 and 1121 respectively are of a structural height in cross-section in the millimeter range, for example from 1.5 mm to about 3 mm FIG. 12 in turn shows a modification in relation to FIGS. 10A-10D with the substantial difference that each enclosure unit 1201 of FIG. 12 forms precisely one receiving means which is individually openable and closable. Besides a corresponding closure functional region 1210, with a hook profile 1212 and a claw profile 1211 similarly to FIGS. 10A-10D, on each receiving means in FIG. 12 each individual receiving means also has at both sides at each narrow side its own fixing profile, for example a claw profile 1211 and a hook profile 1212.

Coming back to FIGS. 2-6 a preferred production method for a flat ribbon line is now proposed, which can be used as a line guide for a clean room application as shown in FIGS. 1A-C.

Figure 2:
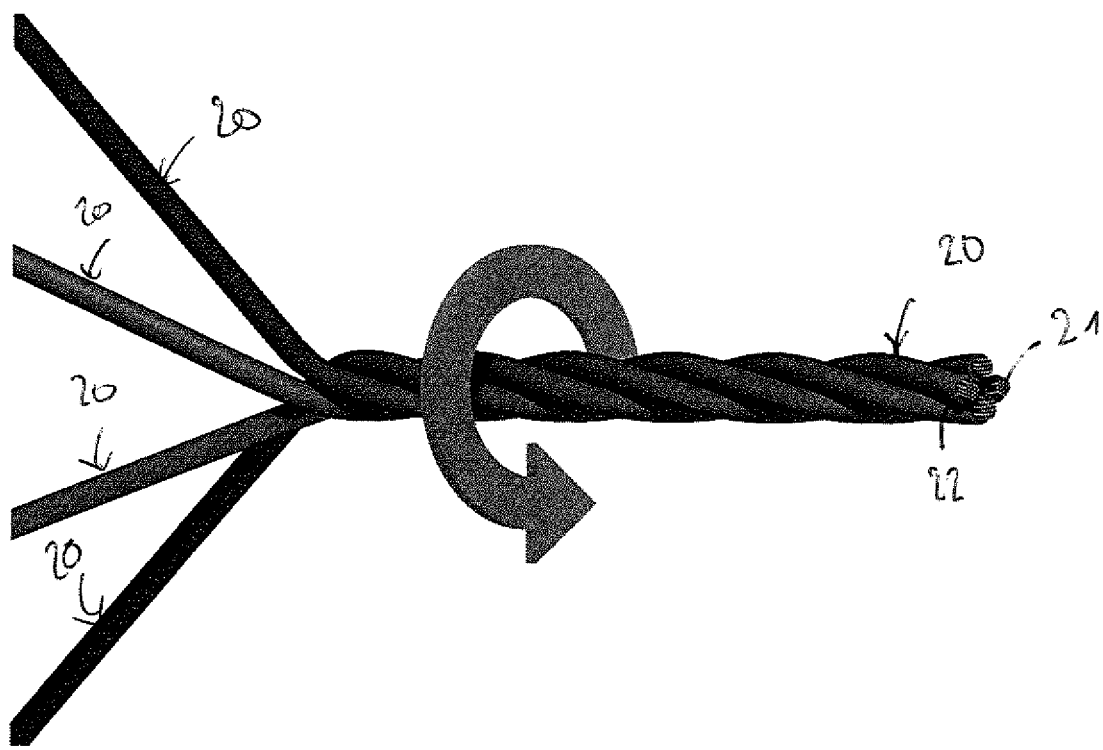
FIG. 2 shows a stranding of for example four individual wires to form a line bundle comprising interrelated lines.
Figure 3:
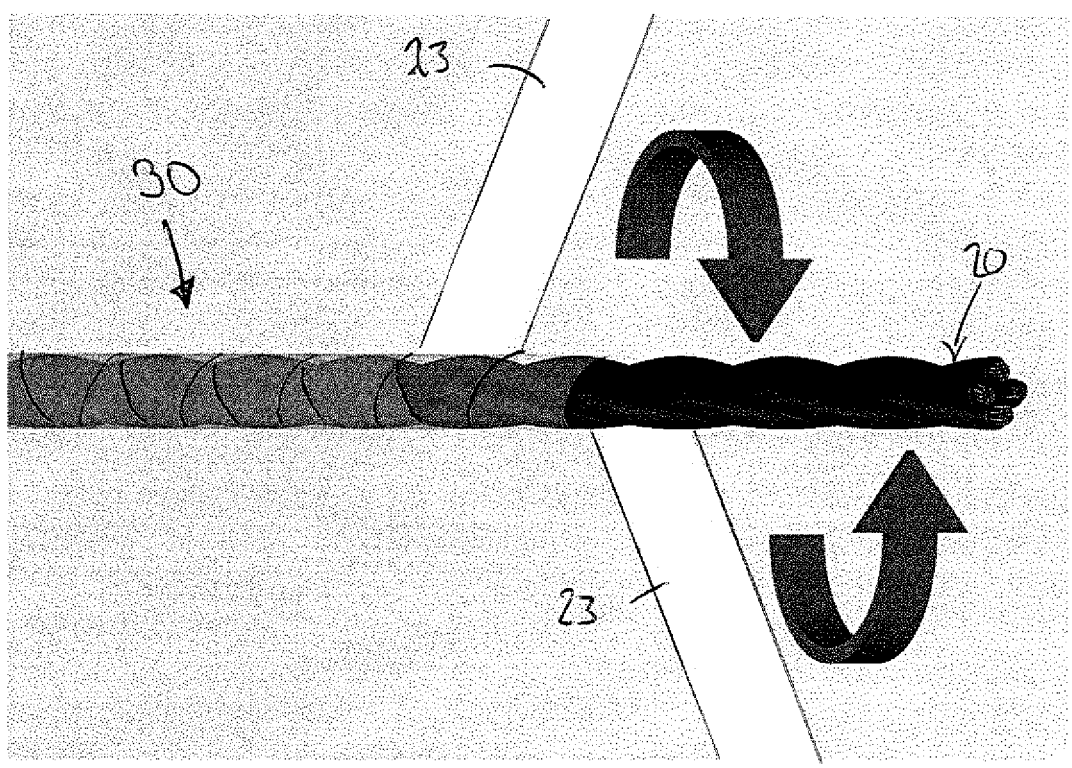
FIG. 3 shows a banding by wrapping in opposite directions of the stranded individual wires of FIG. 2 for producing a line bundle without its own outer sheath, FIG. 4 diagrammatically shows the method step of drawing a line bundle as shown in FIG. 3 into an enclosure unit which is prefabricated in a closed condition for the production of an enclosure for a dust-tight dynamic line guide.

FIGS. 2-3 show a plurality of individual wires 20 consisting of highly flexible stranded line of an individual wire diameter<0.08 mm of the individual wires 21 of each strand. The individual wires 20 are stranded in per se known manner, wherein inter alia the pitch length is adapted to the stranded lines. Each strand has its own suitable insulation 22. The stranded structure comprising individual wires 20 (at the right in FIG. 2) is then banded, preferably with a wrapping comprising two bands or strips of a PTFE film 23, which are wound in opposite directions, as shown in FIG. 3 (at the right).

The resulting line bundle 30 (at the left in FIG. 3) does not have its own outer sheath and can be provided for example by purchase from a cable manufacturer. The procedure for manufacture of such line bundles 30 (at the left in FIG. 3) is known per se but—in a departure from the relevant standards—no outer sheath is deliberately provided here, which typically would be applied to the line bundle 30 by subsequent extrusion. The line bundle can further have components which are not shown here like for example a braid or mesh for screening purposes, a tension-resistant core element and so forth.

FIG. 4 shows one of two steps for the production of a line guide for a clean room application in accordance with the invention. Referring to FIG. 4 a prefabricated enclosure, here by way of example comprising a plurality of enclosure units 901, as described hereinbefore with reference to FIGS. 9A-9C, is provided. Accordingly the prefabricated enclosure 900 has at least one enclosure unit 901 produced in peripherally closed state, having one or more receiving means 902. In the case of the line unit 901 which is produced in a closed condition the line bundle 30 is drawn into the closed enclosure unit in the longitudinal direction L loosely or with a free space relative to the enclosure walls 903, that is to say it is drawn into the enclosure unit with a pulling wire or a suitable procedure. The enclosure units 901 can then or previously be connected to constitute an enclosure 900 (see FIGS. 9A-9D) so that a line guide having a plurality of electric lines 30 is produced, as diagrammatically shown in FIG. 6.

Figure 5A:
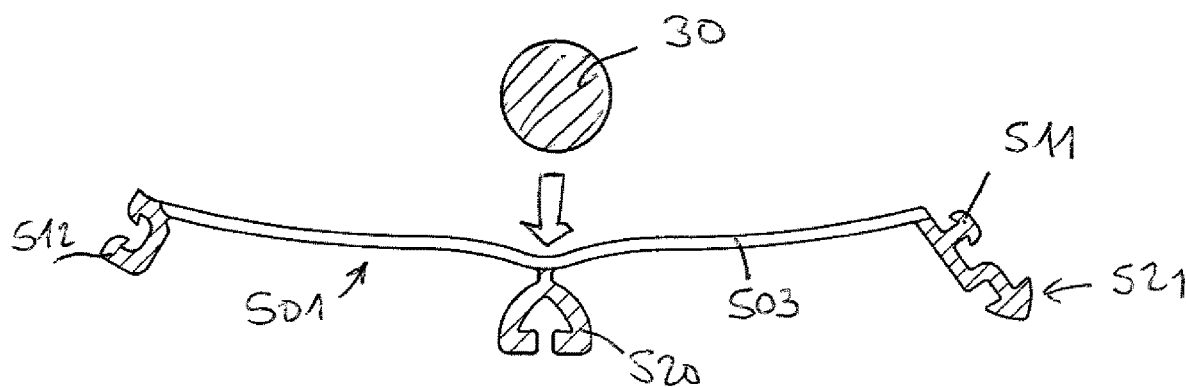
FIGS. 5A-5B show as alternative method steps lateral insertion of a line bundle as shown in FIG. 3 into an openable enclosure unit (FIG. 5B), the closed state of by way of example two enclosure units which were subsequently connected together for producing an enclosure for dust-tight dynamic line guidance, at the same time
Figure 5B:
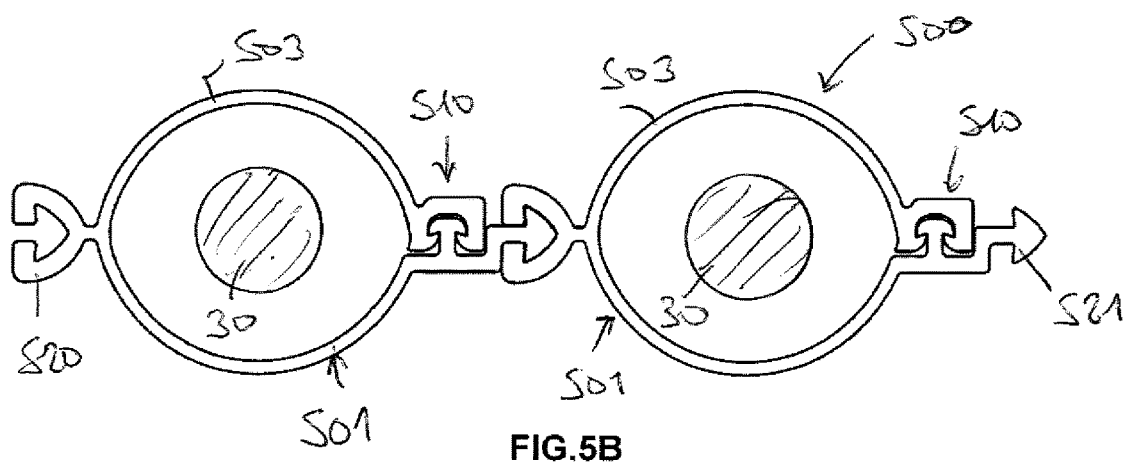
Figure 6:
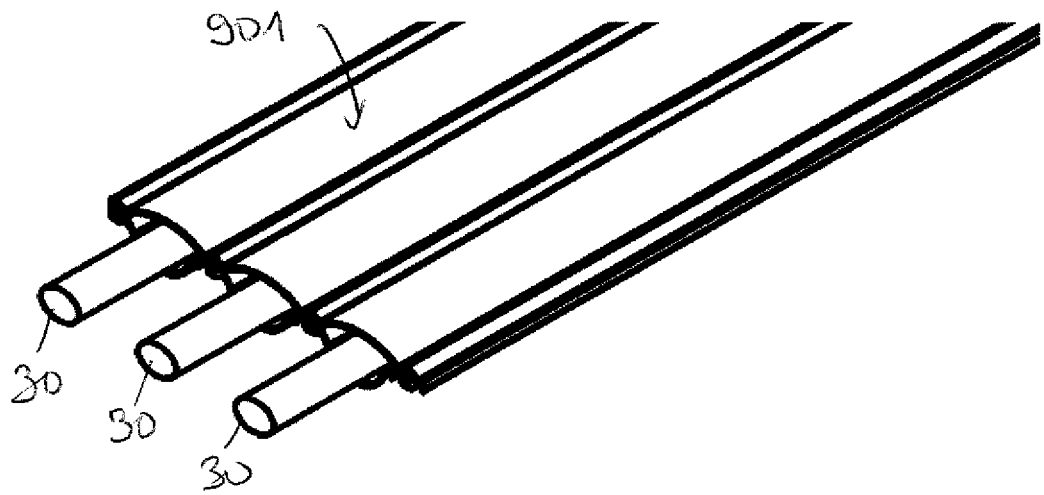
FIG. 6 is a purely diagrammatic perspective view of an enclosure produced in accordance with the principle shown in FIG. 4 or FIGS. 5A-5B respectively.

Alternatively, as FIGS. 5A-5B show, it is also possible to use an openable and closable enclosure unit 501 having two cooperating closure profiles 511, 512 of a closure. As a modification in relation to FIG. 11 here the arrangement shows a closure 510 with only one interengaging profile bar, other features however are equivalent to FIG. 11.

The closure 510 serves for dust-tightly closing an opened state in which the enclosure unit 501 can be produced by extrusion.

In the production method shown in FIGS. 5A-5B a line bundle 30 which is provided as shown in FIGS. 2-3, for example being delivered in that way, is introduced transversely relative to the longitudinal direction into the opened enclosure unit 501 and then the enclosure unit 501 is closed as shown in FIGS. 5A-5B. In that way too a line guide with a plurality of electric lines 30, as diagrammatically shown in FIG. 5B for only two lines 30, can be produced. The enclosure units 501 can then or previously be connected to constitute an enclosure 500 (see FIG. 5B).

Figure 7A:
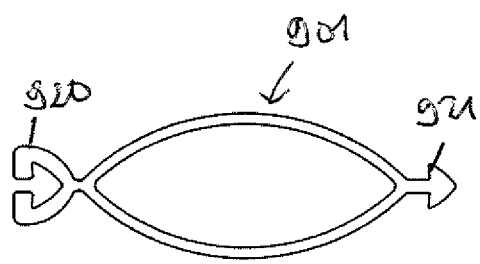
FIGS. 7A-7C show a preferred variant of an enclosure unit prefabricated in a closed condition (as a so-called individual pod)
Figure 7B:
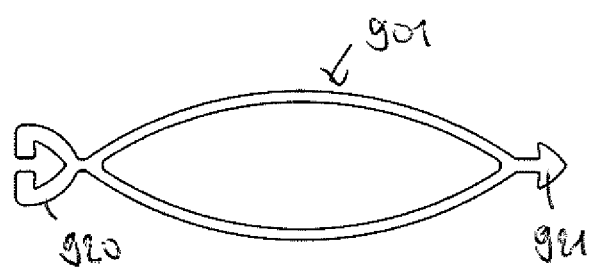
Figure 7C:
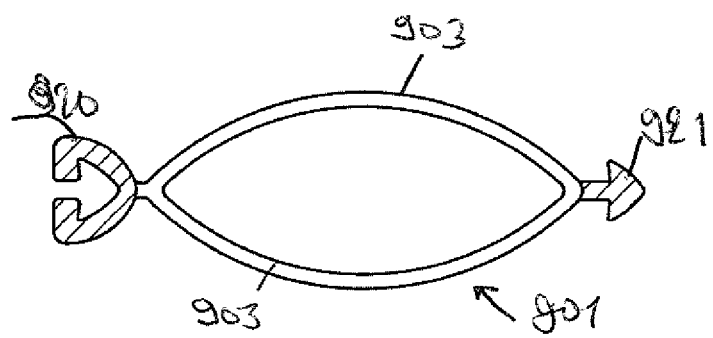

FIGS. 7A-7B show an enlarged view illustrating two variants of the preferred enclosure units 901 used in FIG. 4, in which the peripherally extending enclosure wall 903 is produced in a unitary material with the functional regions 920, 921 for lateral fixing. FIG. 7C shows a variant in which the functional regions 920, 921—formed as described in FIGS. 9-10—are in contrast produced from a different harder plastic than the enclosure wall 903.

Figure 8A:
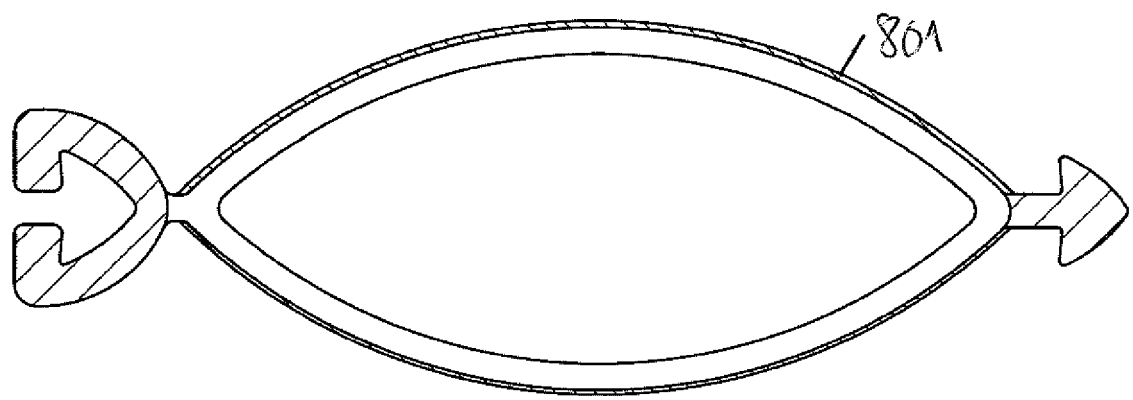
FIGS. 8A-8C show variants of enclosure units with sliding friction-reducing layers at different regions of the outside.
Figure 8B:
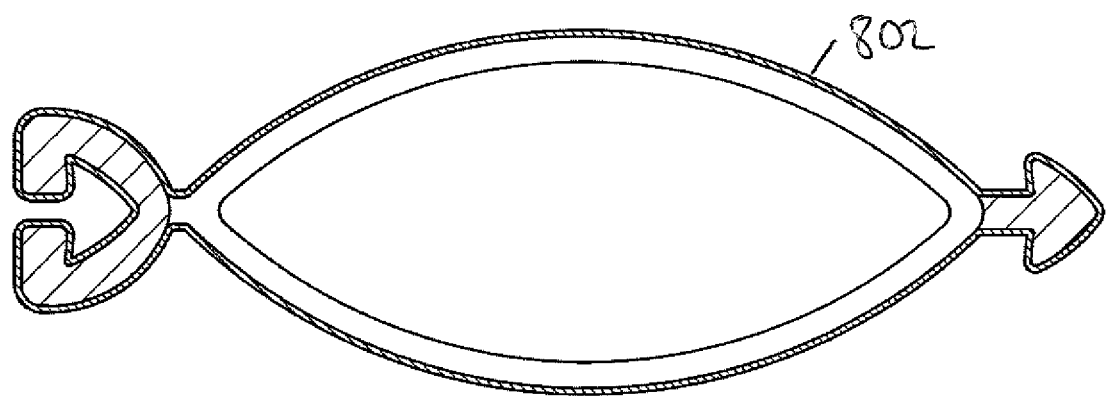
Figure 8C:
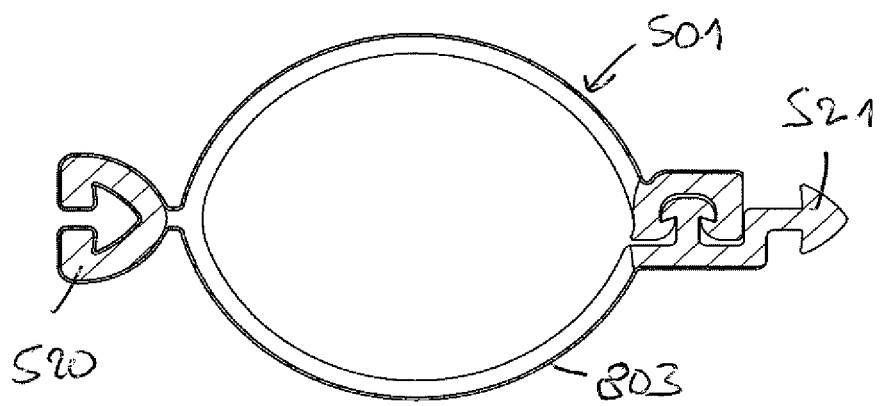

FIGS. 8A-8C show sliding friction-reducing layers comprising a third plastic, in particular a PE-HMW or PE-UHMW, with a lower sliding coefficient in comparison with the first and second plastics (FIG. 7C). That production operation can be effected for example using a tri-extrusion process from three different plastics. In FIG. 8A the sliding friction-reducing layer 801 is provided only externally on the enclosure walls 903.

In FIG. 8B there is provided a sliding friction-reducing layer 802 in full peripheral relationship also on the functional regions 920, 921 for lateral fixing.

FIG. 8C shows a variant in relation to FIGS. 5A-5B with a sliding friction-reducing layer 803 which extends almost completely peripherally, but not at the male hook-shaped connectors 521. A further sliding friction-reducing layer, in particular a PE-HMW or PE-UHMW, can also be provided at the inward side of the receiving means (not shown in FIGS. 8A-8C), that is to say at the side of the enclosure walls 503 and 903, that face towards the line 30.

What is claimed is:

1. A method for production of a line guide for a clean room application, with electric lines and an elongate flexible enclosure which is reciprocatingly displaceable with formation of a direction-changing arc between two runs, wherein the elongate flexible enclosure has a plurality of parallel receiving means for at least one respective line, wherein each receiving means of the plurality of parallel receiving means extends in a passage in a longitudinal direction from a first end to a second end; the method comprising:
   providing at least one line bundle of interrelated lines; and providing the elongate flexible enclosure,
   wherein the elongate flexible enclosure is prefabricated and the at least one line bundle is introduced into a receiving means of the plurality of parallel receiving means of the prefabricated elongate flexible enclosure, wherein the at least one line bundle includes a wire bundle comprising at least two twisted wires each having its own insulation, wherein the at least one line bundle does not have its own respective outer sheath, and
   wherein the prefabricated elongate flexible enclosure comprises at least one enclosure unit having two cooperating closure profiles of a closure for dust-tightly closing an opened state and the at least one line bundle is introduced transversely to the longitudinal direction into the opened enclosure; or
   wherein the prefabricated elongate flexible enclosure includes at least one enclosure unit which is produced peripherally closed and the at least one line bundle is drawn into the closed enclosure unit in the longitudinal direction; and
   wherein the at least one line bundle includes an outward separating layer comprising a slidable material, which at its outside includes a fluoropolymer.

2. The method according to claim 1, wherein the outward separating layer is in a form of banding.

3. The method according to claim 2, wherein the banding has at least one wrapping in opposite directions.

4. The method according to claim 1, wherein:
   the at least one line bundle includes at least two highly flexible stranded lines, each of the flexible stranded lines having an individual wire diameter <0.1 mm, and/or being super-fine stranded lines; and/or
   the at least one line bundle includes at least two stranded lines having an insulation comprising a fluoropolymer; and/or
   the at least one line bundle includes a tension-resistant core element.

5. The method according to claim 1, wherein the wire bundle comprises at least six layer-stranded or bundle-stranded wires.

6. The method according to claim 1, wherein the opened enclosure is dust-tightly closed after introduction of the at least one line bundle by the two cooperating closure profiles.

7. The method according to claim 1, wherein the at least one enclosure unit is prefabricated and has two fixing strips which are in opposite relationship at both sides and which are in one piece with the at least one enclosure unit,
   the at least one enclosure unit comprises a plurality of enclosure units, and connecting the plurality of enclosure units together in parallel.

8. A line guide for at least one line for a clean room application, comprising:
   an elongate flexible enclosure which is reciprocatingly displaceable with formation of a direction-changing arc between two runs, and has a plurality of receiving means for at least one respective line,
   wherein each receiving means of the plurality of receiving means extends in a passage in a longitudinal direction from a first end to a second end,
   wherein the elongate flexible enclosure is separately prefabricated,
   wherein a respective line bundle of interrelated lines is introduced into at least some of the plurality of receiving means,
   wherein each respective line bundle includes a wire bundle comprising at least two twisted wires each having its own insulation,
   wherein each respective line bundle does not have its own respective outer sheath, and
   wherein the elongate flexible enclosure forms an outer sheath of each respective line bundle.

9. The line guide according to claim 8, wherein each respective line bundle includes an outward separating layer comprising a slidable material, which at its outside includes a fluoropolymer.

10. The line guide according to claim 9, wherein the outward separating layer is in a form of banding.

11. The line guide according to claim 9, wherein the banding has at least one wrapping in opposite directions.

12. The line guide according to claim 8, wherein:
   each respective line bundle includes at least two highly flexible stranded lines, each of the flexible stranded lines having an individual wire diameter <0.1 mm, and/or being super-fine stranded lines; and/or
   each respective line bundle includes at least two stranded lines having an insulation comprising a fluoropolymer; and/or each respective line bundle includes a tension-resistant core element.

13. The line guide according to claim 8, wherein the wire bundle comprises at least six layer-stranded or bundle-stranded wires.

14. The line guide according to claim 8, wherein each respective line bundle is replaceably introduced into the at least some of the plurality of receiving means.

15. The line guide according to claim 8, wherein the prefabricated enclosure comprises a plurality of enclosure units:
   wherein the plurality of enclosure units are respectively produced with cooperating closure profiles; and/or
   wherein the plurality of enclosure units are produced peripherally closed, and/or
   wherein the plurality of enclosure units each have two fixing strips which are opposite on both sides and which are in one piece with the enclosure units and by which adjacent enclosure units are connected together in parallel, and/or
   wherein the plurality of enclosure units are of flexurally elastic plastic, wherein each enclosure unit is of a cross-section which remains the same in the longitudinal direction.

16. The line guide for a clean room application produced by the method according to claim 1.

17. A line guide for at least one line for a clean room application, comprising:
   an elongate flexible enclosure which is reciprocatingly displaceable with formation of a direction-changing arc between two runs, and has a plurality of receiving means for at least one respective line,
   wherein each receiving means of the plurality of receiving means extends in a passage in a longitudinal direction from a first end to a second end,
   wherein the elongate flexible enclosure is separately prefabricated,
   wherein a respective line bundle of interrelated lines is introduced into at least some of the plurality of receiving means,
   wherein at least one respective line bundle includes a wire bundle comprising at least two twisted wires each having its own insulation,
   wherein the at least one respective line bundle does not have its own respective outer sheath,
   wherein the elongate flexible enclosure forms the outer sheath of the at least one respective line bundle; and
   wherein the at least one respective line bundle includes an outward separating layer comprising a slidable material, which at its outside includes a fluoropolymer.

* * * * *